UNITED STATES PATENT OFFICE.

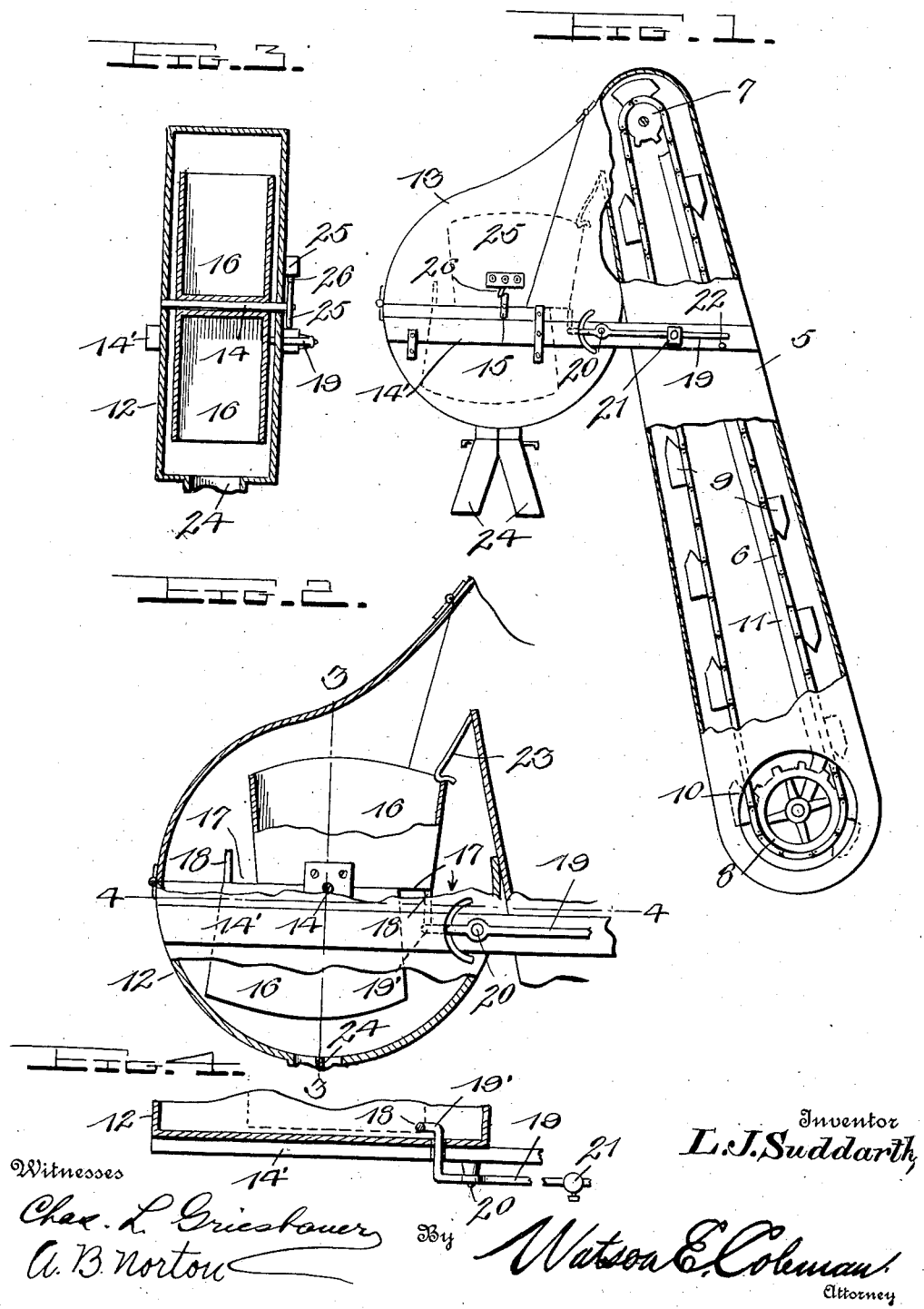

LLOYD J. SUDDARTH, OF SILEX, MISSOURI.

AUTOMATIC WEIGHING-MACHINE.

1,061,338.  Specification of Letters Patent. Patented May 13, 1913.

Application filed July 8, 1912. Serial No. 708,288.

*To all whom it may concern:*

Be it known that I, LLOYD J. SUDDARTH, a citizen of the United States, residing at Silex, in the county of Lincoln and State of Missouri, have invented certain new and useful Improvements in Automatic Weighing-Machines, of which the following is a specification, reference being had to the accompanying drawings.

This invention relates to improvements in automatic weighing machines, the primary object thereof residing in the provision of a simple, efficient and positively operating apparatus for weighing predetermined quantities of grain or similar granular materials.

Another object of the invention is to provide means whereby the weighed material is automatically discharged by the weight of the material itself thus rendering the device extremely accurate in use.

A further and more specific object of the invention is to provide opposed material receiving receptacles mounted upon a common shaft and offset in opposite directions from the axis of said shaft, whereby the receptacles will be overbalanced when the proper quantity of material has been deposited therein, and the flow of material to the receptacle cut off.

Still another object of the invention is to provide a weighing apparatus of the above character which is particularly designed for use in connection with grain elevators, whereby the weight of the grain entering the mill may be determined, and registering mechanism associated with the apparatus to register such weight.

With the above and other objects in view as will become apparent as the description proceeds, the invention consists in certain constructions, combinations and arrangements of the parts that I shall hereinafter fully describe and claim.

For a full understanding of the invention reference is to be had to the following description and accompanying drawing in which—

Figure 1 is a side elevation partly in section of a grain weighing apparatus showing the same arranged in operative relation to a grain elevator; Fig. 2 is an enlarged vertical section of the weighing apparatus; and Fig. 3 is a section taken on the line 3—3 of Fig. 2. Fig. 4 is a section taken on the line 4—4 of Fig. 2.

Corresponding and like parts are referred to in the following description and designated in the accompanying drawing by like reference characters.

Referring in detail to the drawing 5 designates the casing of an elevator within which the endless elevating chain 6 is arranged, said chain traversing the upper and lower sprocket wheels 7 and 8 respectively. This chain carries a plurality of spaced buckets 9 and the grain or other material is fed thereto through an opening 10 in the lower end of the elevator casing. These buckets move over an inclined supporting board 11 arranged within the casing 5.

At the upper end of the casing 5 and upon one side thereof a housing 12 is arranged, said housing including a movable hinged top or cover 13. This housing is mounted between the parallel horizontal side bars 14′ which are secured to the casing of the elevator. In suitable bearings provided upon the opposite side walls of the housing 12 a transversely disposed shaft 14 is mounted. One end of this shaft extends exteriorly of the housing and is provided with oppositely disposed arms 15 for a purpose which will be more fully hereinafter explained. Upon the shaft 14 within the housing 12 the grain receiving receptacles 16 are secured. These receptacles which are of substantially rectangular form are arranged upon opposite sides of the shaft and in opposed relation. It will be observed that said receptacles are not secured centrally between their ends upon the shaft but are offset in opposite directions therefrom or eccentrically mounted upon the shaft to provide the overhanging or projecting end portions indicated at 17, said end portions of each receptacle extending beyond the adjacent end of the opposed receptacle. To the bottom of each receptacle 16 at the projecting end thereof a lug 18 is secured, said lugs extending outwardly from the corresponding sides of the receptacles. These lugs are adapted to engage with the offset end 19′ of a longitudinally disposed beam 19 which is fulcrumed as at 20 upon one of the longitudinal bars 14′. A weight 21 is arranged upon this beam and is adapted to be longitudinally adjusted thereon and secured in its adjusted position by a set screw in the usual manner, so that various amounts of material may be weighed. A stop pin 22 is secured to the bar 14′ with which the end of the beam 19 is adapted to engage to limit the pivotal movement of said beam in one direction and maintain the offset end 19′ in position for engagement by the lugs upon the receptacles 16.

In order to hold the receptacles 16 in proper position to receive the material from the elevator buckets, I provide a yieldable arm or plate 23 which is secured at one end to the elevator casing 5. The free end of said plate has a hook formed thereon for engagement over the upper edge of one of the end walls of the receptacle 16 when the same arrives at its receiving position, thus holding said receptacle against reverse movement as the grain is being deposited therein. The plate 23 also serves the purpose of a guide and guard member for the grain, said plate directing the grain into the receptacle 16 from the discharge opening of the elevator casing and preventing the same from falling between the receptacle and the casing wall.

The operation of the apparatus above described is as follows: As the grain is fed into the lower end of the elevator, it is received in the buckets 9 and elevated by the chain 6 to the upper end of the casing, at which point it is discharged into the uppermost receptacle 16 upon the shaft 14. As the receptacle becomes filled with the grain or other material, the same will be overbalanced, the greater portion of the grain being arranged upon one side of the shaft 14. This over-balancing of the receptacle causes the same to move downwardly, the lug 18 bearing upon the end of the weighted beam rocking said beam upon its fulcrum. As the receptacle 16 continues to move downwardly, the material therein is discharged into a suitable container arranged beneath the housing 12. The bottom of this housing is provided with divergently disposed discharge spouts 24, each of which is preferably provided with a valve plate so that the entrance of material thereto from the housing may be cut off. This discharge movement of the loaded receptacle brings the other of the receptacles 16 in position to receive its load, the plate 23 engaging the upper edge of the receptacle as previously described to prevent excessive movement thereof. This operation continues as long as the grain is discharged by the elevator buckets 9.

In order to determine the quantity of material which has been weighed, I provide a registering device indicated generally by the numeral 25 which is arranged upon one of the side walls of the hinged cover 13 of the housing. This registering mechanism includes an operating lever 26 which is adapted to be engaged by the arm 15 upon the end of the shaft 14. Thus upon the discharge of the grain from each of the receptacles 16, as the same is overbalanced, the registering device 25 will be actuated, and the numeral wheels thereof moved to register the number of times the receptacles have been filled and the material weighed. By multiplying the number of such operations by the weight of material discharged by the receptacle, the total weight of the grain entering the mill may be accurately determined.

From the foregoing, it is thought that the construction and manner of operation of my improved weighing machine will be clearly understood. The device consists of very few parts which may be inexpensively manufactured and readily installed in position for use in the ordinary grain mill. It is of course apparent that the device is not limited in its use to the weighing of grain, but may be employed for weighing or measuring various other materials. As the apparatus is primarily actuated by the weight of the material itself, it will be seen that exactly the same amount of grain will be received and discharged by each of the receptacles, thus rendering the apparatus extremely accurate.

While I have shown and described the preferred construction and arrangement of the various elements, it will be understood that the invention is susceptible of considerable modification without departing from the essential features or sacrificing any of the advantages thereof.

Having thus described the invention what is claimed is:

1. In an automatic weighing machine, the combination with an elevator including a casing having a discharge opening at its upper end, of weighing mechanism including opposed receptacles mounted for rotation around a common axis, a housing for the receptacles mounted upon the elevator casing, a weighted pivotally mounted beam normally supporting the receptacles in their receiving positions, and a stop plate extending outwardly from the discharge opening of the elevator casing to be engaged by the receptacles and limit their movement to their receiving positions said plate also acting to direct the material from the elevator into the receptacles.

2. In an automatic weighing machine, the combination with a grain elevator including a casing having a discharge opening at its upper end, of weighing mechanism comprising opposed receptacles mounted to rotate about a common axis, a housing for the receptacles secured to the upper end of the elevator casing, a pivotally mounted weighted beam to support said receptacles and adapted to be overbalanced by the weight of material deposited therein, and a resilient stop plate extending downwardly and outwardly from the discharge opening in the elevator casing and adapted to engage at its free end with one of the receptacle walls to limit the movement of the receptacle to its receiving position, said plate further acting as a directing member for the material discharged from the elevator.

In testimony whereof I hereunto affix my signature in the presence of two witnesses.

LLOYD J. SUDDARTH.

Witnesses:
 WILLIAM A. CAMPBELL,
 C. G. BROWN.

Copies of this patent may be obtained for five cents each, by addressing the "Commissioner of Patents, Washington, D. C."